United States Patent
Åkerblom et al.

(10) Patent No.: US 9,378,489 B2
(45) Date of Patent: Jun. 28, 2016

(54) SYSTEM AND METHOD FOR REGISTERING OF REFUSE COLLECTION

(71) Applicant: Daprox AB, Kungens Kurva (SE)

(72) Inventors: Bengt Åkerblom, Vårby (SE); Mikael Hemlén, Västerhaninge (SE)

(73) Assignee: DAPROX AB, Kungens Kurva (SE)

( * ) Notice: Subject to any disclaimer, the term of this patent is extended or adjusted under 35 U.S.C. 154(b) by 0 days.

(21) Appl. No.: 14/367,126

(22) PCT Filed: Dec. 14, 2012

(86) PCT No.: PCT/SE2012/051400
§ 371 (c)(1),
(2) Date: Jun. 19, 2014

(87) PCT Pub. No.: WO2013/112091
PCT Pub. Date: Aug. 1, 2013

(65) Prior Publication Data
US 2014/0347166 A1    Nov. 27, 2014

(30) Foreign Application Priority Data

Jan. 26, 2012   (SE) ...................................... 1250054

(51) Int. Cl.
*G07C 3/00*         (2006.01)
*G06Q 10/00*        (2012.01)
(Continued)

(52) U.S. Cl.
CPC .............. *G06Q 10/30* (2013.01); *B65F 1/1484* (2013.01); *G06K 19/0723* (2013.01); *G06K 2007/10534* (2013.01); *G07C 3/00* (2013.01); *Y02W 90/20* (2015.05)

(58) Field of Classification Search
USPC .......................................................... 340/10.1
See application file for complete search history.

(56) References Cited

U.S. PATENT DOCUMENTS 4,121,102 A * 10/1978 Wilson .................... G01S 17/74
                                              250/338.1
5,008,661 A *  4/1991 Raj ......................... B61L 25/04
                                              340/10.33
(Continued)

FOREIGN PATENT DOCUMENTS

DE        42 23 088 A1    1/1994
DE     2008 005 119 A1    9/2008
(Continued)

OTHER PUBLICATIONS

International Search Report for PCT/SE2012/051400 dated Apr. 3, 2013.

(Continued)

*Primary Examiner* — Brian Miller
(74) *Attorney, Agent, or Firm* — Knobbe Martens Olson & Bear LLP

(57) ABSTRACT

The invention shows s system (1) and a method for registering a collection of refuses from a refuse bin (19) to a refuse collection lorry (3). The refuse bin is provided with an information carrier (21) which is adapted to send information upon reception of an electromagnetic signal. An interrogator (9) and a registering unit (4) are provided on a holder (15), which is attachable to a person (23) who collects the refuse. The interrogator (9) is adapted to send an electromagnetic signal and to receive information from the information carrier (21). The registering unit (4) is connected to the interrogator (9) and is able to register information received from the interrogator (9).

8 Claims, 7 Drawing Sheets

(51) Int. Cl.
*B65F 1/14* (2006.01)
*G06K 19/07* (2006.01)
*G06K 7/10* (2006.01)

(56) References Cited

U.S. PATENT DOCUMENTS

| | | | | |
|---|---|---|---|---|
| 5,095,309 A * | 3/1992 | Troyk | | B61L 25/04 340/10.3 |
| 5,336,245 A * | 8/1994 | Adams | | A61N 1/37235 128/904 |
| 5,491,483 A * | 2/1996 | D'Hont | | B65F 1/1484 340/568.1 |
| 5,514,861 A * | 5/1996 | Swartz | | G07G 1/0045 235/462.44 |
| 5,793,032 A * | 8/1998 | Bard | | G04B 37/0016 235/462.15 |
| 6,098,886 A * | 8/2000 | Swift | | G06K 7/10891 235/462.44 |
| 6,290,134 B1 * | 9/2001 | Rando | | G06K 7/10891 235/462.45 |
| 6,302,461 B1 * | 10/2001 | Debras | | B65F 1/1484 177/139 |
| 6,448,898 B1 * | 9/2002 | Kasik | | B65F 1/14 177/137 |
| 6,510,376 B2 * | 1/2003 | Burnstein | | G06K 19/0723 701/117 |
| 6,614,351 B2 * | 9/2003 | Mann | | G06K 7/10881 340/10.42 |
| 6,646,552 B1 * | 11/2003 | Lippert | | A41D 19/0024 235/439 |
| 7,109,460 B2 * | 9/2006 | Diamantstein | | G06K 7/10712 235/462.42 |
| 7,318,529 B2 * | 1/2008 | Mallett | | A61L 11/00 206/366 |
| 7,501,951 B2 * | 3/2009 | Maruca | | B65F 1/1484 340/572.1 |
| 7,609,406 B2 * | 10/2009 | Roth | | B41J 3/36 235/375 |
| 8,146,798 B2 * | 4/2012 | Flood | | B65F 1/1484 235/375 |
| 2005/0035860 A1 * | 2/2005 | Taylor | | G06K 7/0008 340/572.1 |
| 2006/0221363 A1 * | 10/2006 | Roth | | B41J 3/36 358/1.6 |
| 2008/0094224 A1 * | 4/2008 | Parker | | B65F 1/1646 340/572.8 |
| 2008/0169342 A1 * | 7/2008 | Gonen | | B65F 1/1484 235/375 |
| 2011/0279245 A1 | 11/2011 | Hynes et al. | | |
| 2012/0010746 A1 * | 1/2012 | Sundholm | | B07C 5/3412 700/226 |
| 2014/0047681 A1 * | 2/2014 | Walker | | B65F 1/1484 24/530 |
| 2014/0236446 A1 * | 8/2014 | Spence | | B65F 1/1484 701/70 |

FOREIGN PATENT DOCUMENTS

| | | |
|---|---|---|
| GB | 2416612 A | 2/2006 |
| GB | 2449710 A | 12/2008 |
| WO | WO 2010/112668 A1 | 10/2010 |

OTHER PUBLICATIONS

Supplementary European Search Report for EP 12 86 6879 dated Aug. 20, 2015.

* cited by examiner

--PRIOR ART--

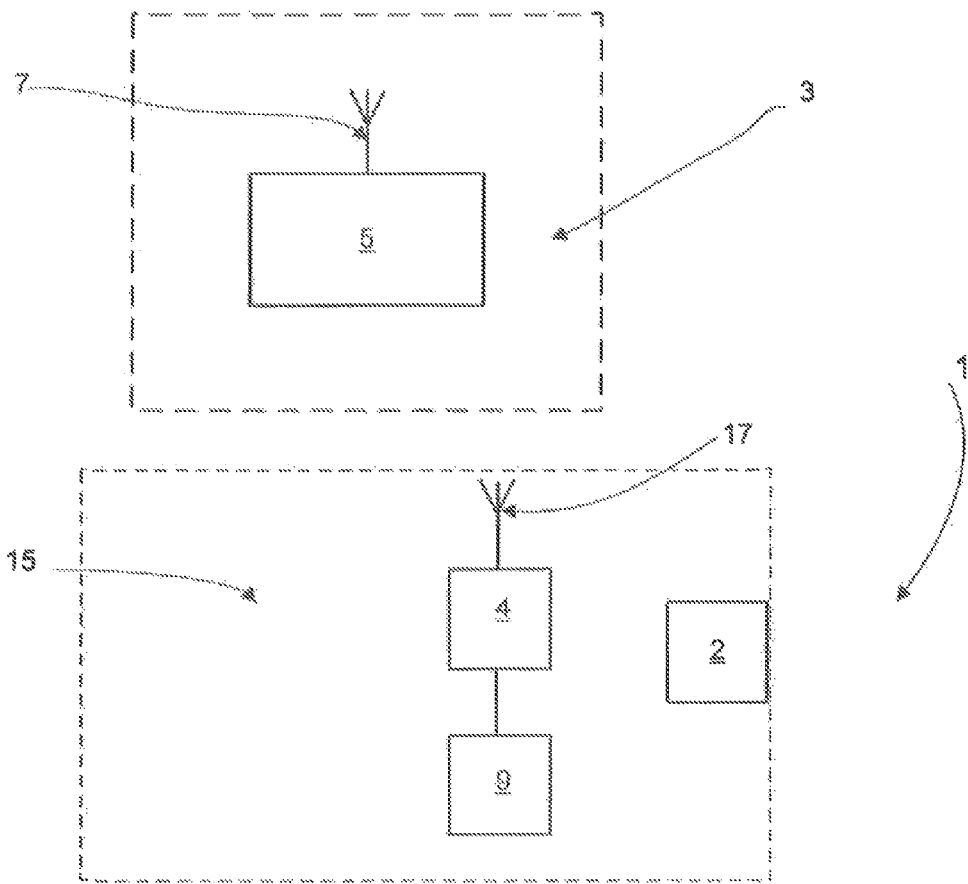
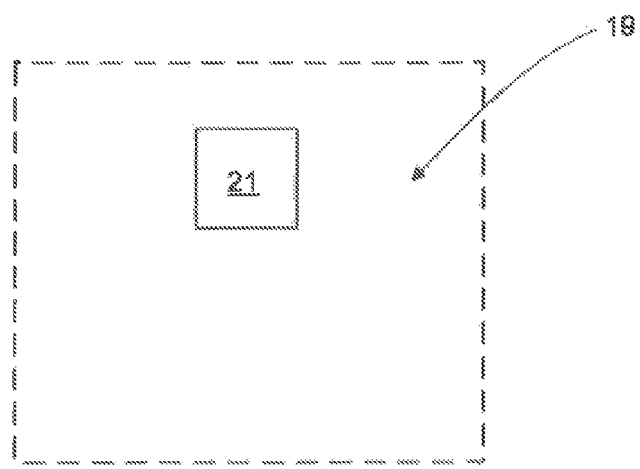
Fig 2

SYSTEM AND METHOD FOR REGISTERING OF REFUSE COLLECTION

CROSS REFERENCE TO RELATED APPLICATIONS

This application is a U.S. National Phase Application of PCT International Application Number PCT/SE2012/051400, filed on Dec. 14, 2012, designating the United States of America and published in the English language, which is an International Application of and claims the benefit of priority to Swedish Patent Application No. 1250054-2, filed on Jan. 26, 2012. The disclosures of the above-referenced applications are hereby expressly incorporated by reference in their entireties.

TECHNICAL FIELD

The present invention relates to a system and a method according to the preamble of claim 1 and claim 6 respectively for registering of refuse collection from a refuse bin to a refuse collection lorry.

BACKGROUND ART

Usually a refuse collection company have to collect the refuse from a number of refuse bins in a defined area. This is performed by a refuse collector driving around in the area, from refuse bin to refuse bin, in a refuse collection lorry. An important issue hi this procedure is to keep track of all collections so that all refuse bins are collected and no refuse bin is forgotten. A forgotten refuse bin can result in extra charges for the refuse collection company.

Today many refuse collection companies handles this by attaching an RFID tag to the refuse bin and by providing the refuse collection lorry with an RFID reader, and connecting the RFID reader to a computer system. When a refuse collector collects refuse from a refuse bin, he parks the refuse collection lorry in the neighbourhood of the refuse bin. Then he drives or carries the refuse bin into the proximity of the lorry and empties the refuses into the refuse container in the lorry. Thereafter he positions the refuse bin in close proximity of the RFID reader positioned at the lorry so that the RFID tag on the refuse bin can inform the RFID reader that the refuse bin has been emptied.

With reference to FIG. 1, an example of a system according to the state of the art is generally depicted. The system comprises a refuse collection lorry 3, and a refuse bin 19 (only showed schematically). The refuse bin is provided with an RFID tag 21 (RFID=Radio Frequency Identification Device) and the lorry is provided with an RHO interrogator 9 (also called "RFID reader"). An RFID tag is an electronic identification device that is made up of a chip and an antenna. The interrogator 9 sends an electromagnetic signal to the tag 21 which uses the energy from the signal to transmit the information stored in the RFID tag 21 to the interrogator 9. The interrogator 9 forwards the information to a computer system 6, which handles and stores the information.

This last step is quite burdensome and time consuming, especially if the refuse bin is empty already at the beginning and doesn't need to be emptied. In this situation the refuse collector has to drive or carry the refuse bin into close proximity of the lorry in order to register that he has been at the site and has checked the status of the refuse bin, even though he does not have to empty the refuse bin.

SUMMARY OF THE INVENTION

The object of the present invention is to overcome the above mentioned weaknesses of the known technology.

An object with the present invention is to create a system for registering a refuse collection, which system is easy to use and which leads to a fast, efficient and simple registering procedure.

A further object of the present invention is to create a system and a method for registering a refuse collection, which economizes on the energy consumption.

These objects are achieved with a system for registering of refuse collection being defined in the introduction comprising the features of the characterizing part of claim 1. The advantage with the system is that it is easy to use and leads to a fast, efficient and simple registering procedure.

According to a preferred embodiment of the present invention the holder is a bracelet. This has the advantage that the holder is easy to attach, to view and to handle by the person who collects the refuses.

According to another preferred embodiment of the present invention an accelerometer unit is provided on the holder and is connected to the interrogator. The accelerometer unit is adapted to identify a defined movement performed by the person who collects the refuse, and upon identification of the defined movement send a request to the interrogator to start sending an electromagnetic signal to the information carrier. This has the effect that the interrogator only sends an electromagnetic signal when the refuse collecting person is close to the refuse bin and wants to perform a registration of the refuse collection. This leads to reduced energy consumption since the interrogator only sends the electromagnetic signal when it can be used by the system.

According to yet another preferred embodiment of the present invention the holder is provided with a sound generator connected to the registering unit. The sound generator is adapted to emit a sound when the registering unit has registered the information received from the interrogator. This has the effect that the refuse collecting person knows that the registering has been performed, so time can be saved in that he doesn't have to doubt whether the registration has been performed or not. This is especially advantages in combination with the accelerometer unit, since the refuse collecting person knows when to stop performing the defined movement.

The present invention further defines a method for registering a collection of refuses as defined in the introduction, comprising the steps of attaching an interrogator to the refuse collection collecting person, wherein interrogator is adapted to send an electromagnetic signal and to receive information for the information carrier, the refuse collecting person approaching the refuse bin, the interrogator sending an electromagnetic signal to the information carrier, and the information carrier sending information to the interrogator.

The advantage with the method is that it is a fast, efficient and simple way of registering a refuse collection.

According to another preferred embodiment of the present invention the method also comprises the steps:

connecting an accelerometer unit to the interrogator,
the refuse collecting person performing a defined movement, which is identified by the accelerometer unit,
the accelerometer unit sending a request to the interrogator to start sending an electromagnetic signal.

This has the effect that the interrogator only sends an electromagnetic signal when the refuse collecting person is close to the refuse bin and wants to perform a registration of the refuse collection. This leads to reduced energy consumption since the interrogator only sends the electromagnetic signal when it can be used by the system.

According to yet another preferred embodiment of the present invention the method also comprises the steps:

attaching a sound generator to the refuse collecting person and connecting the sound generator to the registering unit, the sound generator emitting a sound.

This has the effect that the refuse collecting person knows that the registering has been performed, so time can be saved in that he doesn't have to doubt whether the registration has been performed or not. This is especially advantages in combination with the accelerometer unit, since the refuse collecting person knows when to stop performing the defined movement.

BRIEF DESCRIPTION OF THE DRAWINGS

Further advantages and features of the present invention can be derived from the following detailed description of exemplary embodiments of the invention, with reference to the drawings.

FIG. 2 shows a principal scheme of a system for registering a refuse collection according to a first embodiment.

DETAILED DESCRIPTION

Figure 4:
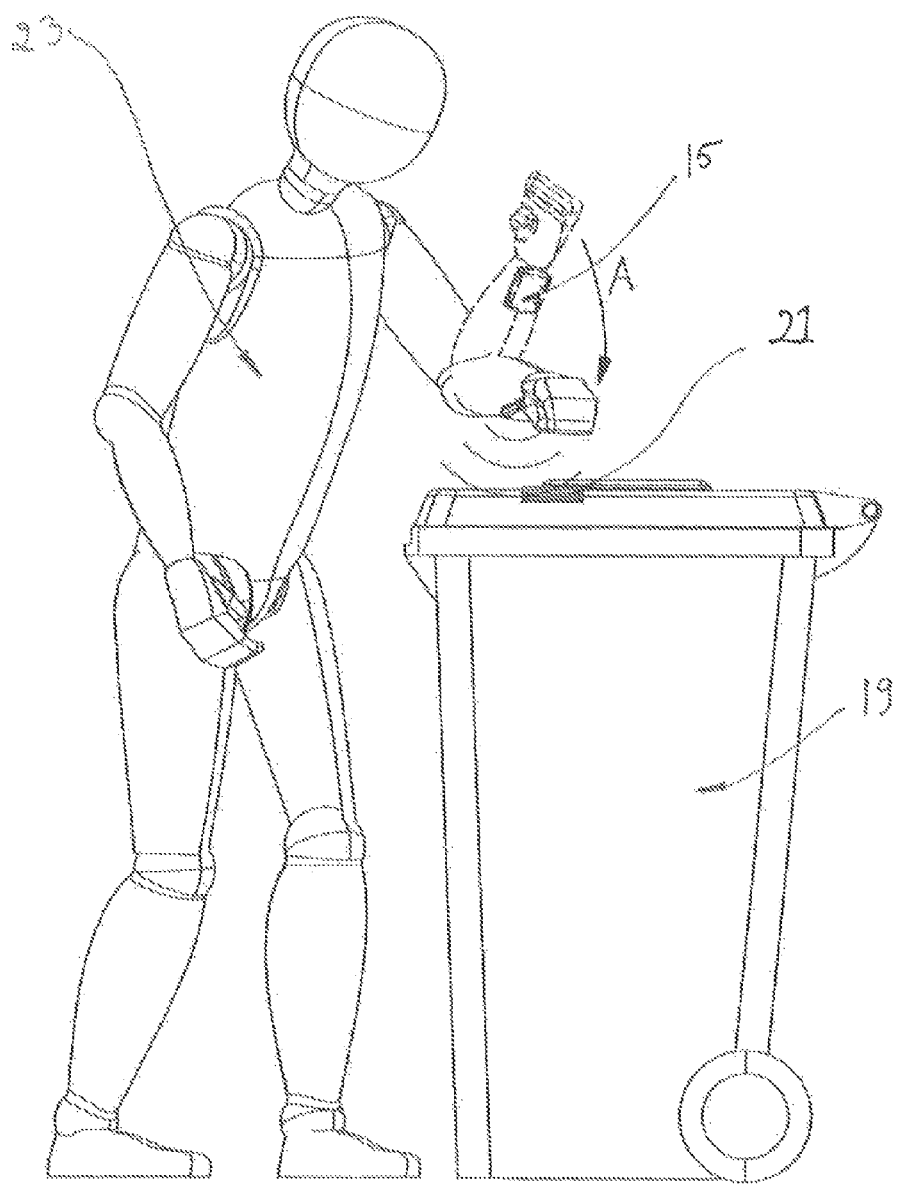
FIGS. 4 and 5 show two views of a movement performed by the refuse collector.

FIG. 2 shows the system 1 of the present invention. The system 1 comprises a refuse collection lorry 3. The refuse collection lorry has a computer system 5. The refuse bin 19 is provided with an information carrier 21, which in this embodiment is an RFID tag. The system also comprises a holder 15, which is adapted to be attached to a person (not shown, see FIG. 4 ref. 23). The lorry 3, the refuse bin 19 and the holder 15 are only shown schematically. According to this embodiment the holder 15 is a bracelet. The holder 15 is provided with an interrogator 9. The interrogator 9 is able to send an electromagnetic signal to the information carrier 21, which uses the energy from the electromagnetic signal to transmit the information stored in the information carrier 21 to the interrogator 9. The interrogator 9 is in this embodiment an RFID reader. The interrogator 9 is connected to a registering unit 4 on the holder 15. The information transmitted from the information carrier 21 to the interrogator 9 is forwarded to the registering unit 4, which stores the information. The registering unit 4 is connected to an antenna 17 which can send the information stored in the registering unit 4 to the computer system 5 via a second antenna 7 in the lorry 3. The computer system 5 is able to store, handle and display the information. The holder 15 is also provided with a battery unit 2. The battery unit 2 is connected to the interrogator 9 and to the registering unit 4 and acts as a current supply (not shown in the figures). The battery unit 2 can be connected to a current supply connection on the holder 15. The current supply connection is not shown in the figure, but in this embodiment it is an USB port.

Figure 1:
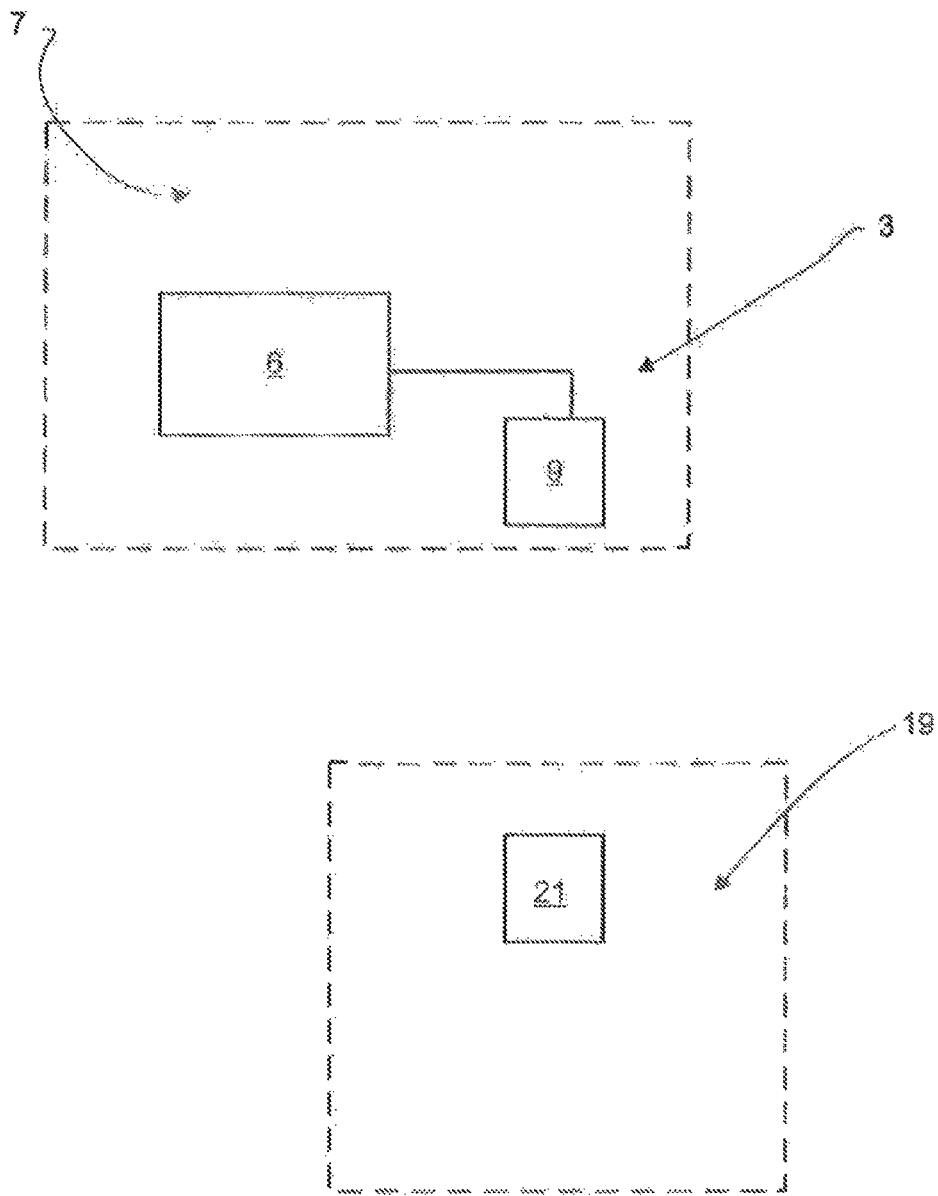
FIG. 1 shows a principal scheme of a system for registering a refuse collection according to the state of the art.
Figure 3:
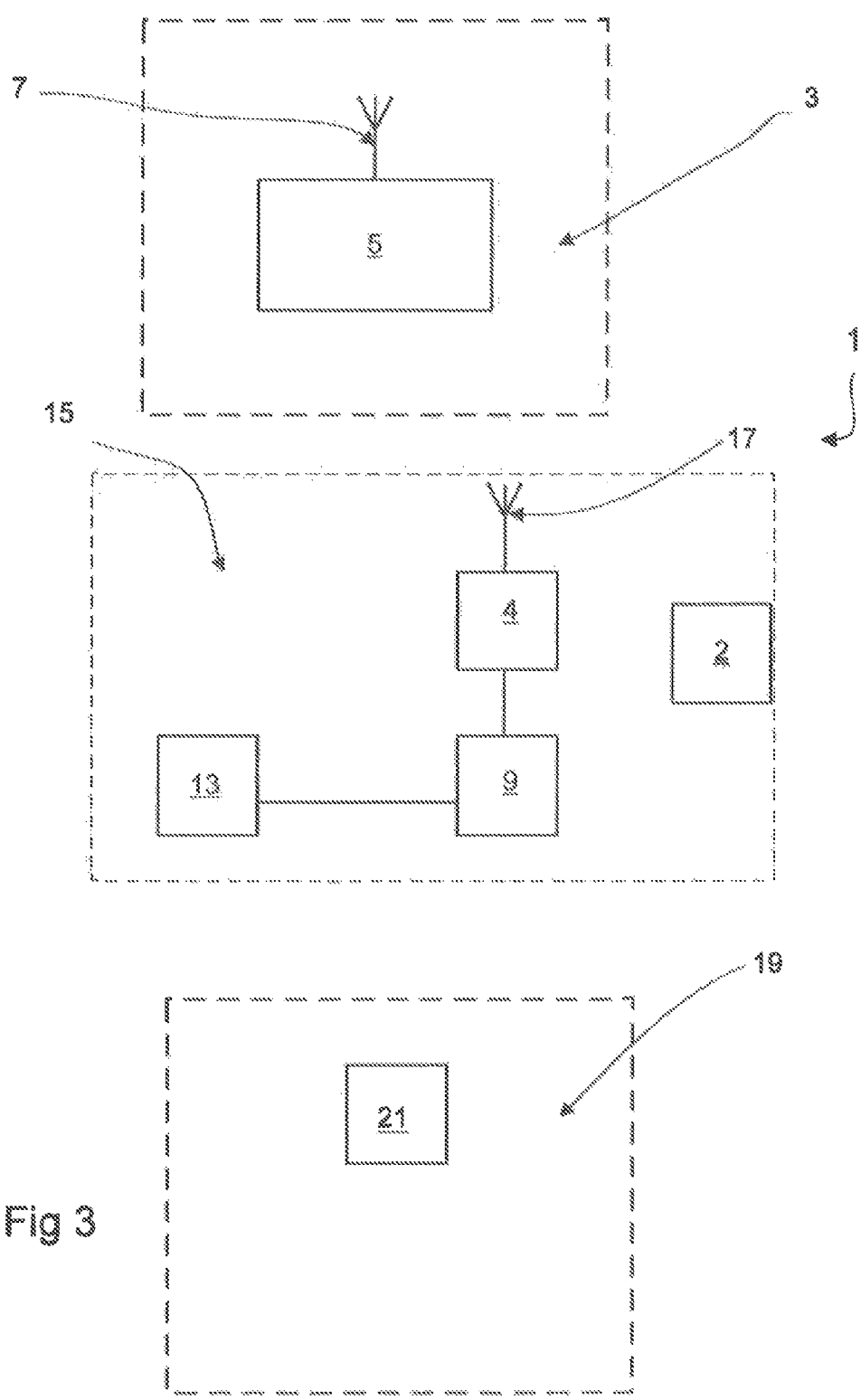
FIG. 3 shows a principal scheme of a system for registering a refuse collection according to a second embodiment.
Figure 5:
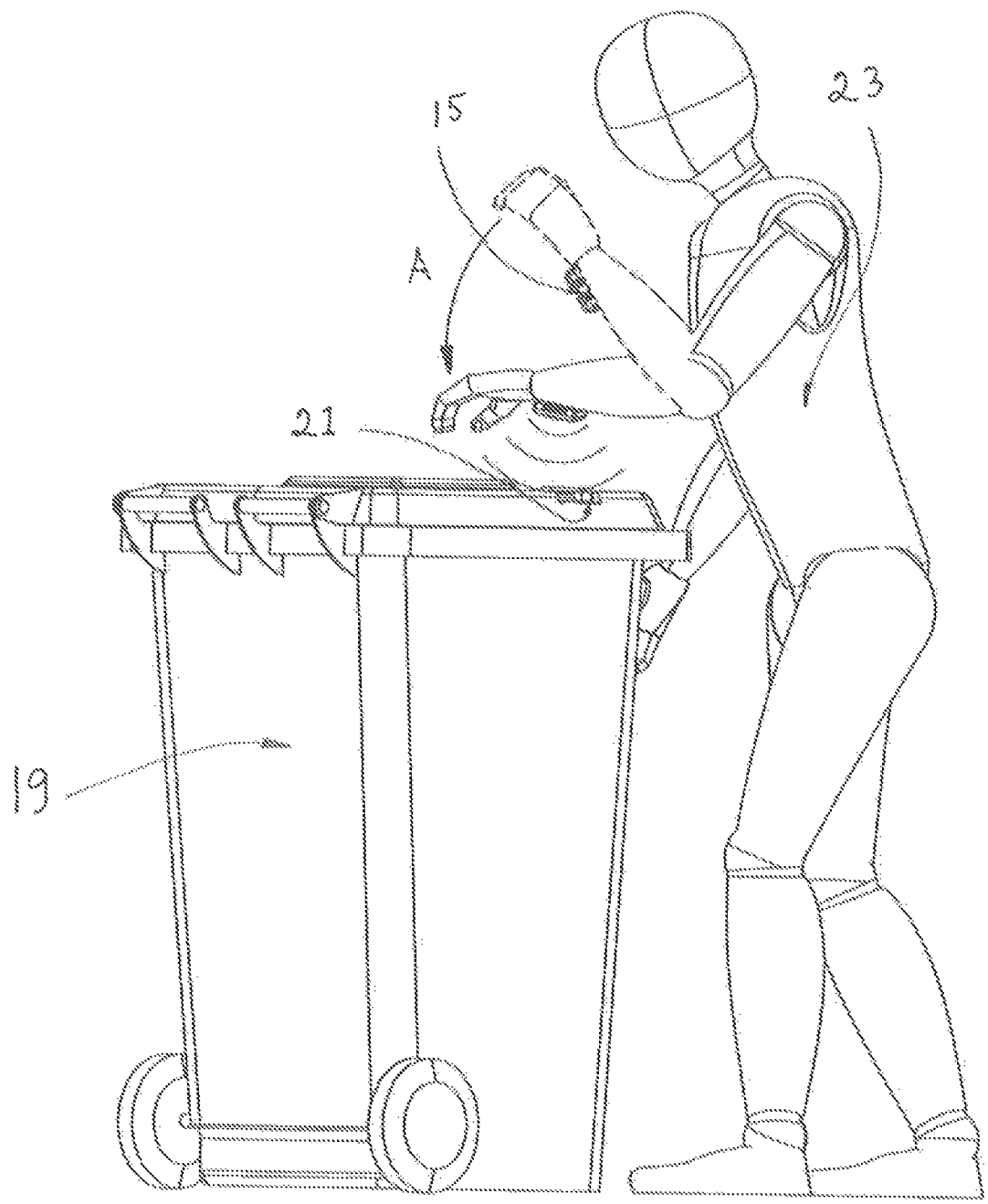

FIG. 3 depicts another embodiment according to the present invention. The system differs from the system shown in FIG. 2 in that the holder 15 is provided with an accelerometer unit 13, which is connected to the interrogator 9. The accelerometer unit 13 is able to recognise or identify a certain movement from the person 23 who collects the refuse, who is wearing the holder 15. When the movement has been recognised, the accelerometer unit 13 sends a signal to the interrogator 9 to start sending an electromagnetic signal to the information carrier 21. This movement is shown in the FIGS. 4 and 5 with the arrow A. The movement can e.g. be a vertical movement as depicted in the figures, but it could be any movement like e.g. a horizontal movement or a circular movement.

Figure 6:
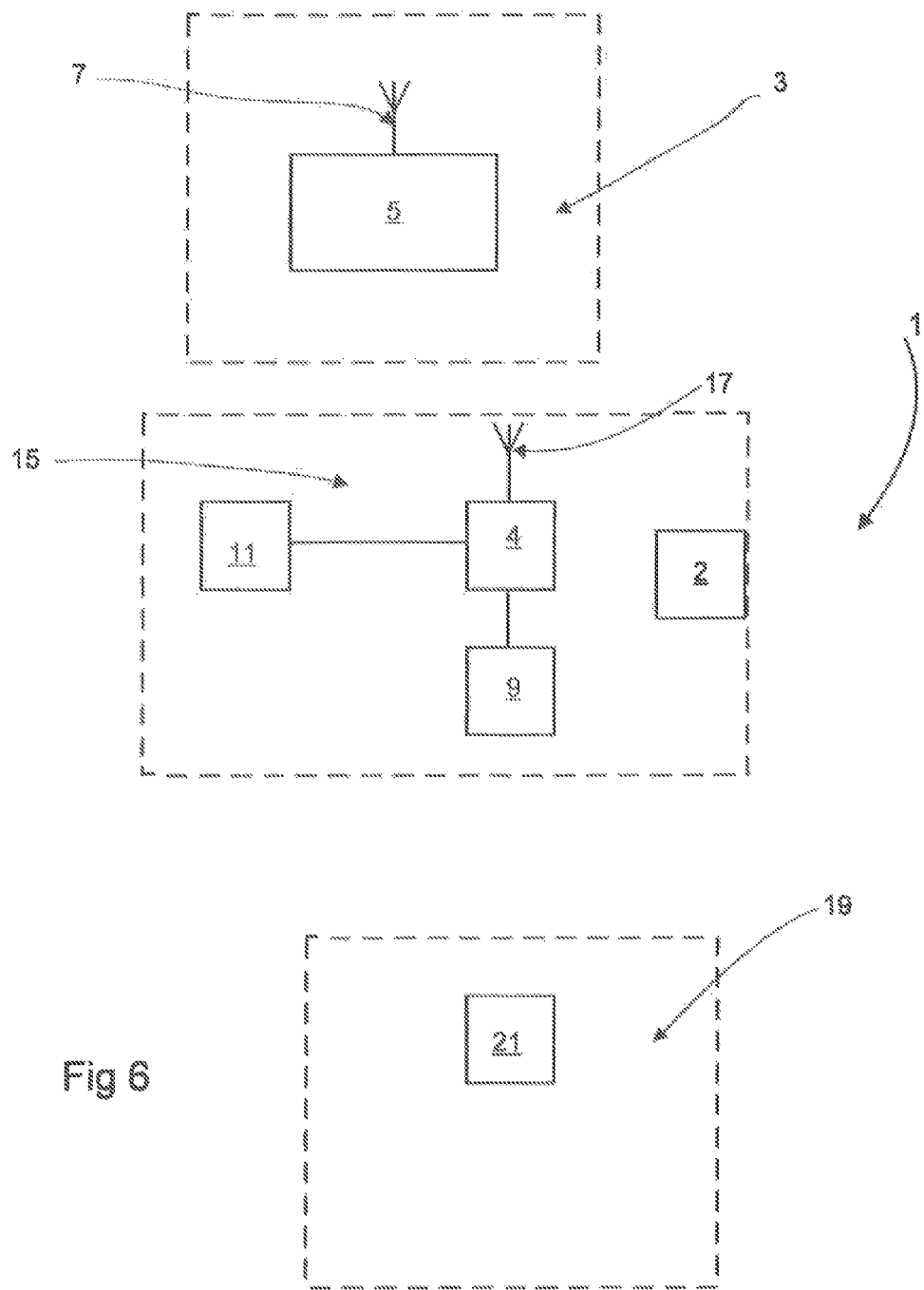
FIG. 6 shows a principal scheme of a system for registering a refuse collection according to another embodiment.

FIG. 6 depicts another embodiment according to the present invention. The system differs from the system shown in FIG. 2 in that the holder 15 is provided with a sound generator, which is connected to the registering unit 4. The sound generator generates a sound when the registering unit 4 has registered the information sent from the information carrier 21.

Figure 7:
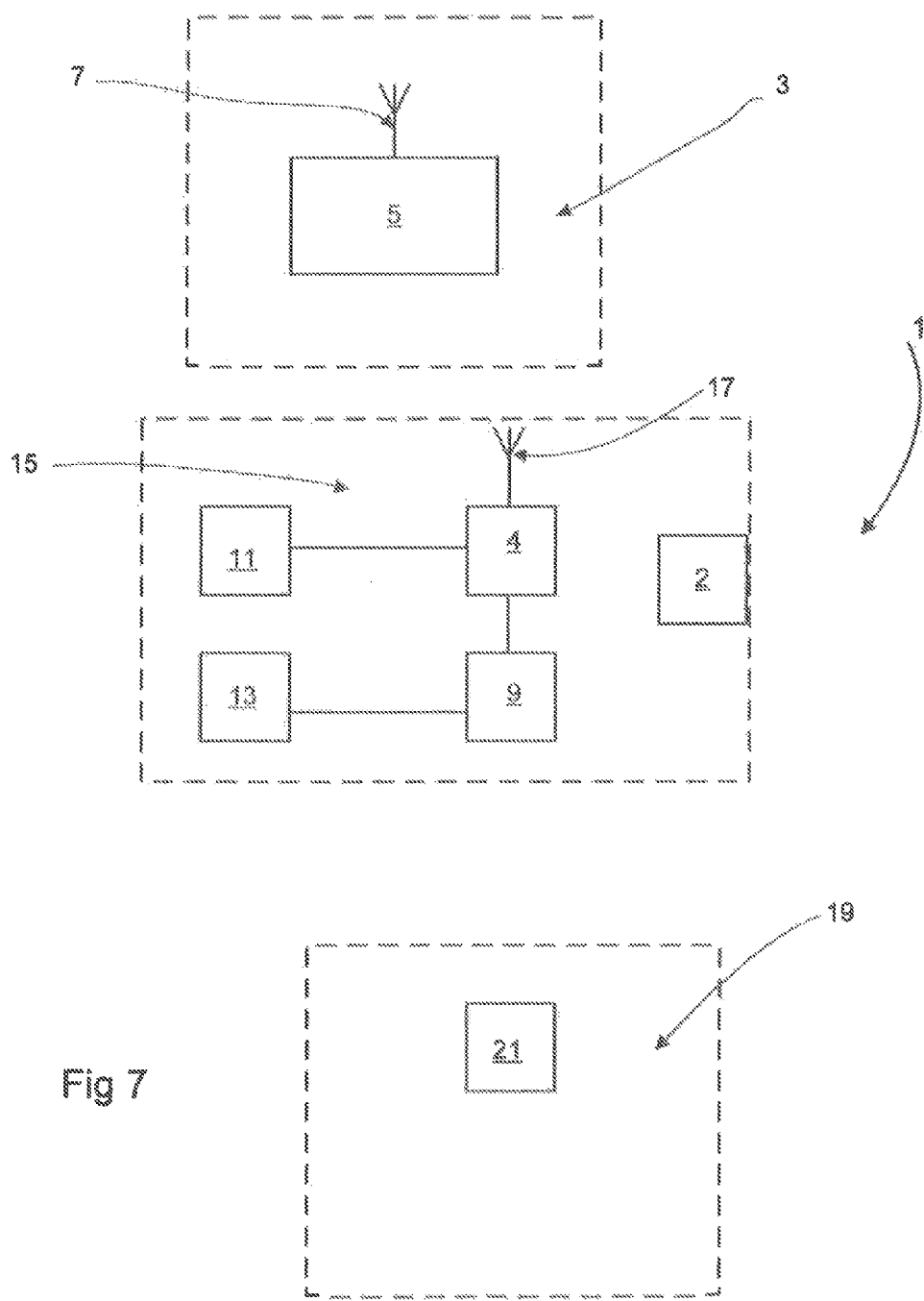
FIG. 7 shows a principal scheme of a system for registering a refuse collection according to still another embodiment.

FIG. 7 shows a further embodiment according the present invention, in which the system of FIG. 2 is provided with both an accelerometer unit 13 and a sound generator 11.

The present invention is not limited to the shown embodiments. The embodiments can be combined and/or further developed without limiting the scope of the invention.

The information carrier 21 is not limited to be an RFID tag. It can principally be any device that is able to send information upon reception of an electromagnetic signal. The interrogator 9 is not limited to be an RFID reader. It can be any device, which is able to send an electromagnetic signal and to receive information from the information carrier 21.

The holder 15 is not limited to be a bracelet. Principally the holder 15 can be positioned on other parts of the body of the refuse collector 23.

The current supply connection is not limited to be an USB port. It can be any connection, which makes it possible to charge the battery unit 2 from an external current supply source.

The information transmitted between the two antennas 7 and 17 can be transmitted through a wire instead of wireless.

The computer system 5 doesn't have to be positioned at the lorry. It can principally be positioned anywhere.

The computer system 5 can be left out. Instead the registering unit 4 can be connected to other units attached to the holder 15, like e.g. a calculating unit and a presentation unit, which units handle and display the information sent from the information carrier 21. It is also possible to provide the system with both the computer system 5 and other units connected to the registering unit 4 like e.g. a calculating unit and a presentation unit.

The invention claimed is:

1. A system for registering a collection of refuses from a refuse bin to a refuse collection lorry, the system comprising:
   an information carrier provided on the refuse bin, which information carrier is adapted to send information upon receipt of an electromagnetic signal,
   an interrogator adapted to send an electromagnetic signal and to receive information from the information carrier,
   a registering unit connected to the interrogator, which registering unit is able to register information received from the interrogator, wherein the interrogator and the registering unit are provided on a holder that is attachable to a person, wherein the holder comprises an accelerometer, wherein the accelerometer is connected to the interrogator, wherein the accelerometer unit is adapted to identify a defined movement indicative of refuse collection performed by the person, and upon identification of the defined movement send a request to the interrogator to send an electromagnetic signal to the information carrier.

2. The system of claim 1, wherein the holder is a bracelet.

3. The system according to claim 1, wherein the registering unit is connected to a sound generator provided on the holder, which sound generator is adapted to emit a sound when the registering unit has registered the information received from the interrogator.

4. The system according to claim 3, wherein the information carrier is an RFID tag and the interrogator is an RFID reader.

5. The system of claim 1, wherein the defined movement indicative of refuse collection comprises one or more of a horizontal, a vertical, and a circular movement.

6. A method for registering a collection of refuses from a refuse bin provided with an information carrier to a refuse collection lorry, wherein the collection is performed manually by a person, comprising:

connecting an accelerometer unit to the interrogator, attaching an interrogator to the person, which interrogator is adapted to send an electromagnetic signal and to receive information from the information carrier, wherein the interrogator sends an electromagnetic signal to the information carrier as the person approaches the refuse bin and the information carrier sends information to the interrogator, identifying by the accelerometer a defined movement performed by the person, the defined movement indicative of refuse collection; and in response to identifying the defined movement, sending a request by the accelerometer unit to the interrogator to start sending an electromagnetic signal.

7. The method according to claim 6, wherein the method further comprises as an initial step:

attaching a sound generator to the refuse collecting person and connecting the sound generator to the registering unit, and the following steps are performed after information from the information carrier is sent to the interrogator:

the sound generator emits a sound.

8. The method according to claim 6, wherein identifying by the accelerometer the defined movement performed by the person, the defined movement indicative of refuse collection comprises identifying one or more of a horizontal, a vertical, and a circular movement.

\* \* \* \* \*